United States Patent Office 2,796,742
Patented June 25, 1957

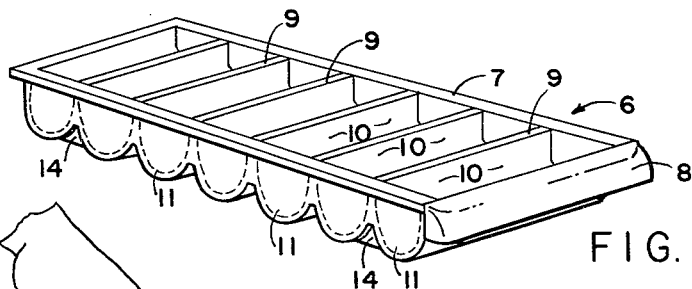
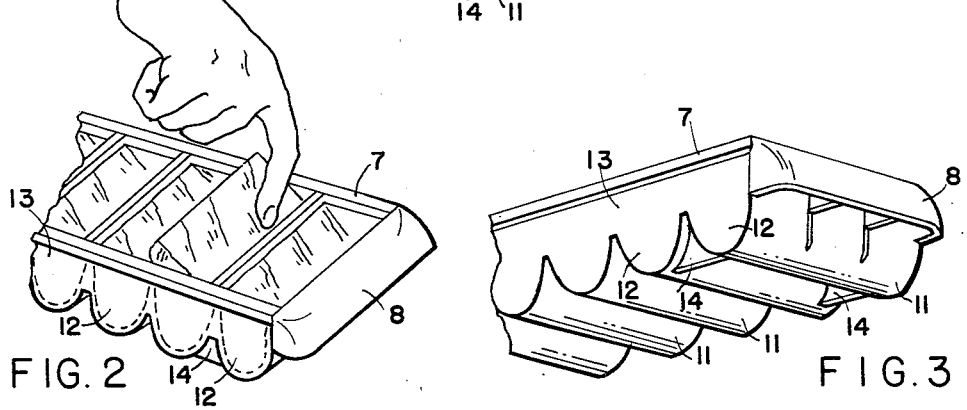
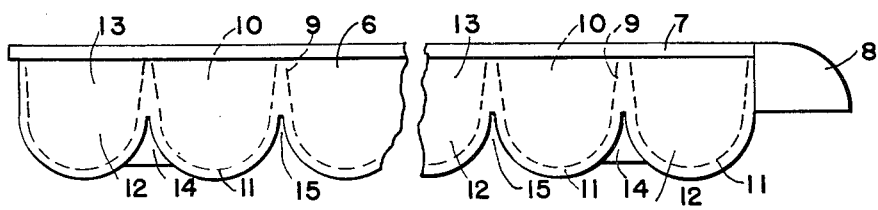
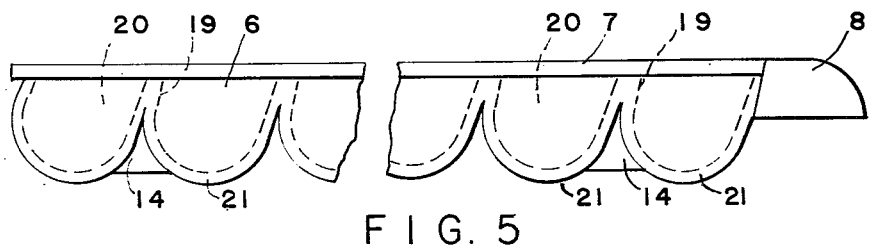

2,796,742
ICE TRAY
Gilbert G. Platt, Santa Ana, Calif.

Application August 10, 1953, Serial No. 373,101

2 Claims. (Cl. 62—108.5)

This invention relates to ice-trays for use in refrigerator apparatus for freezing discrete lumps of ice of suitable size and shape for cooling beverages.

Plastic ice-trays have had considerable vogue, due principally to the fact that they can be bent or twisted to dislodge the ice-cubes frozen in them but the fact remains that plastic materials are inferior to metals as conductors of heat, and plastic trays of the same shape as ordinary metal trays—that is, with partitions forming rectangular interior compartments for freezing cubes—require longer time to effect freezing of their contents. I am also aware of ice-trays which have curvilinear partitions by means of which ice-blocks are formed as segments of spheres or of circular disks, the blocks being rotatable upon their curved surfaces within their respective compartments so as to be removed by grasping an upwardly thrust edge or end. However, such curvilinear trays as I have observed are wasters of space in the freezers of refrigerators, where space is usually at a premium, in that their ice-content is a relatively small part of their total space requirements. Furthermore, they are not designed to stack properly. It is good practice to place a freshly-watered tray on the cold shelf and to place a frozen tray on top of it, if space conservation requires stacking. Too often the top tray will nest within, instead of upon, the lower tray, displacing the unfrozen water. Still furthermore the curvilinear trays tend to be flexible to the point of fragility, and require not only metal material but an excessive amount of it, disposed where it does little good as a heat conductor to assist in freezing ice. A further disadvantage of both rectangular ice cubes and curvilinear ice-blocks to date has been that their shapes did not lend themselves to easy stirring in a glass but required the use of a spoon or "swizzle-stick."

It is an object of this invention to provide an ice-tray from which individual ice-blocks may be easily removed without dumping the entire contents of the tray.

Another object of the invention is to provide an ice-tray for freezing ice-blocks in the novel shape of rather elongated half-cylinders, whereby one or two blocks may conveniently be placed in a tall glass and may be stirred or "swizzled" therein by merely rapidly moving the glass with a horizontal circular motion, thus mixing and chilling the contents of the glass from top to bottom.

Another object of the invention is to provide an ice-tray which freezes ice-blocks of a novel shape by means of which a beverage may be chilled with great rapidity.

A further object of the invention is to provide an ice-tray for freezing curvilinear blocks which has large capacity relatively to its over-all cubic dimensions and thereby is capable of freezing both a large number of blocks, and blocks of substantial individual size, without occupying undue amount of space.

Still another object is to provide a plastic ice-tray which has a large area of exterior heat-conducting surface and is thereby capable of freezing ice rapidly.

Yet another object is to provide an ice-tray which has the advantages of the limited flexibility of plastic construction, and yet has inherent rigidity, hitherto found in curvilinear trays only when coupled with heavy metal construction, so as not to be fragile at temperatures below freezing, and which may be stacked on a lower tray instead of nesting therein.

Other objects and advantages arising from the novel features of my invention hereinafter claimed will be apparent from the following description, in the light of the accompanying drawing, both the description and drawing being illustrative of examples of my invention and not to be considered as limiting.

In the drawing, Fig. 1 is a perspective view of an ice-tray embodying the principles of my invention;

Fig. 2 is a fragmentary perspective view similar to Fig. 1, showing how ice-blocks may be extracted from the tray;

Fig. 3 is another fragmentary perspective view, from below, showing construction of the bottom of the tray;

Fig. 4 is a side elevational view of the tray shown in Figs. 1, 2, and 3; and

Fig. 5 is a side elevational view of a modified embodiment of my invention.

Having reference to the details of the drawing, I have shown in Fig. 1 a tray having a body 6 provided with a peripheral rim 7 and having a handle 8 at one end. The body 6 is shown as having the conventional elongated rectangular shape but may be square or of any other shape suitable for its purpose. The body 6 is divided by transverse partitions 9 into a plurality of compartments 10 which preferably extend completely across the tray transversely to its long axis. The transverse partitions 9, which form side walls for the elongated compartments 10, extend downward from the rim 7 about half-way to the bottom of the tray, then becoming tangent to curved bottom walls 11. The compartments 10 have end-walls 12 which unite at the level at which the partitions 9 join the curved bottom walls 11, and thereabove form continuous side walls 13 for the body 6, extending upward to the rim 7. Spaced slightly inwardly from the sides of the body 6, the bottom walls 11 of each pair of end compartments 10 are joined by webs 14. The webs 14 extend substantially to the bottom of the body 6, in planes radial to the curvature of the walls 11 which they join—that is, in the type of tray illustrated, in planes parallel to the long axis of the tray.

The curvature of the bottom walls 11 is half-round, or a 180 degree arc of a circle, and since the walls 11 extend across the tray body between the end walls 12, the walls 11 and 12 internally define half-cylinders. The partitions or compartment side walls 9, tangent to these half-cylinders at their full diameter, give added depth to the compartments 10. Externally the half-round walls 11 define air-spaces 15 which widen rapidly downwardly from the junction of contiguous walls.

In the modified form of tray illustrated in Fig. 5, the partitions or compartment side-walls 19 extend upwardly from the bottom walls 21 but at an inclination from the vertical when the tray is horizontal. As the partition walls 19 are tangent to the walls 21 substantially at the full diameters of the half-round walls, it follows that the half-cylinders formed by the walls 21 are also tilted and the compartments 20 are inclined to the long axis of the tray body so that when the tray is horizontal and the compartments are filled with water to the highest point of the half-cylinder, the water surface will intersect the opposite partition wall 19 above the contiguous margin of the wall 21.

As hereinbefore stated, I prefer to make my improved ice-tray of plastic material, and the above-described embodiments of my invention have been conceived with a view to taking the greatest advantage of favorable characteristics of plastic trays and of avoiding disadvantages thereof, but it will be obvious that some of the novel features of my invention may be incorporated advantageously in metal trays, and where in the appended claims no mention of material is made, it will be understood that I claim the form in trays of any material. Numerous suitable plastic materials are available, particularly among the thermo-setting resins which harden by polymerization at high temperatures and which retain considerable flexibility in thin sheets or molded forms even at very low temperatures, and in view of the wide-spread knowledge of such materials it is not believed necessary to deal herein with their chemistry. A particular resin which I have found very satisfactory is polyethylene, a hard resin which in thicknesses of about 1/10 inch or less will yield to torsion which a child might apply sufficiently to dislodge the frozen contents of a tray and will return elastically to its untwisted form.

Considerable experimentation with trays of differing structure and material has demonstrated that freezing at all surfaces not in direct contact with a "cold plate," or other equivalent heat-exchanger, is dependent on the freedom of circulation of cold air currents. Where air spaces are narrow and air circulation is restricted, the rate of freezing is relatively low. It will be observed that in my tray the air spaces 15 are not mere slots between adjacent compartments, but are wide at the bottom where the air would be in contact with a cold plate. There are no side walls or obstructions blocking the ends of the air-spaces 15 except where the webs 14 occur, and consequently the air-spaces 15 permit air to enter freely in contact with the cold plate and to depart freely when it has absorbed heat through the walls 11. To continue the air-spaces 15 narrowly upward would be inefficient; instead, the partitions 9 and continuous side walls 13 are extended downward through what would otherwise be an inefficient zone. The partitions 9 and side walls 13 thus are enabled to provide a desirable degree of rigidity and elasticity to the entire structure while the thickness of all walls is reduced to a minimum, and the rate of heat-transfer through the walls is increased accordingly.

When the half-cylindrical ice-blocks have been frozen, they may easily be dislodged and removed without the use of running water or other melting methods. A slight twist upon the ends of the tray will loosen the blocks in their respective compartments. Finger pressure upon one long edge of a half-cylindrical block will cause the block to rotate in its compartment, the opposite long edge of the block rising and the half-turned block being easily grasped and removed.

In either form of my invention, as shown in Fig. 4 or Fig. 5, it is possible to fill the compartments substantially to the top with water and yet remove the blocks, even though the blocks then formed are not true half-cylinders. If the tray shown in Figs. 1–4 is in use, it may be desirable to restrict the twisting of the tray at first to one end, so as to dislodge only the end blocks, and then to shake the end-block from the tray. Thereafter, additional blocks, having been twisted loose, may be easily removed without inverting the tray, being successively removed away from the emptied compartment. The thin flexible partitions 9 will yield sufficiently when not supported by an ice-block on the opposite side to permit blocks having a considerable height above the true half-cylinder to be rotated and removed in the normal manner. If the tray shown in Fig. 5 is in use, even a block in a compartment between filled compartments may be removed by rotation by pressing upon the shorter of the two tangential sides of the block. Thus the cubic capacity of a tray may be utilized to a very large extent, and without waste, for ice-freezing.

The small webs 14 at the ends of the tray permit one tray to be stacked upon another without nesting in and displacing water from the lower tray. They also provide some longitudinal rigidity at the ends of the tray. If an unfrozen tray is being placed in the refrigerator, or is being withdrawn for observation, it will normally be grasped by one end and the unsupported weight of the other end may cause the tray to bend or buckle. The webs 14 resist such a tendency, while still permitting use of thin material throughout the tray and without materially affecting air-circulation.

A feature of the frozen product of my improved tray is the facility with which it cools a beverage. The long half-cylinders may readily be stirred in a glass when like stirring of cubes or other shapes would be difficult. If two of the half-cylinders are placed face to face in an ordinary drinking glass containing a beverage, and the glass is tilted as for drinking, the equal flotation of the two ice-blocks will cause them to rotate until the contiguous faces are in a vertical plane. Drinking from the glass then draws the beverage through a channel between the two faces resulting in almost instant cooling. This feature effectively eliminates the need for stirring and is very pleasing to those persons who enjoy drinking beverages quickly chilled with minimum dilution.

I claim:

1. An ice-freezing tray comprising a body having a plurality of compartments each having a half-round bottom wall and partition walls extending upwardly from said bottom wall and substantially tangent thereto, said partition walls being inclined from the vertical in like direction when said tray is horizontal.

2. An ice-freezing tray comprising a body having a plurality of elongated parallel compartments, each of said compartments having a half-round bottom wall, end walls, and a partition wall substantially tangent to said bottom wall, said bottom wall and said end walls substantially defining a half-cylinder, said half-round bottom wall being inclined so that one upper margin thereof is below the other margin, said partition wall joining said one margin at a level below said other margin.

References Cited in the file of this patent

UNITED STATES PATENTS

| | | |
|---|---|---|
| 1,865,456 | Chilton | July 5, 1932 |
| 1,868,503 | Kennedy | July 26, 1932 |
| 2,043,881 | Buchanan | June 9, 1936 |
| 2,064,655 | Geyer | Dec. 15, 1936 |
| 2,083,081 | Moll | June 8, 1937 |
| 2,269,642 | Zerk | Jan. 13, 1942 |
| 2,466,747 | Siebigteroth | Apr. 12, 1949 |
| 2,537,915 | Roop | Jan. 9, 1951 |
| 2,574,662 | Sampson | Nov. 13, 1951 |
| 2,584,838 | Boyle | Feb. 5, 1952 |
| 2,587,852 | Jahn | Mar. 4, 1952 |
| 2,588,222 | Ekkebus | Mar. 4, 1952 |